(12) United States Patent
Mizumaki

(10) Patent No.: US 7,352,089 B2
(45) Date of Patent: Apr. 1, 2008

(54) DRIVING APPARATUS

(75) Inventor: Masao Mizumaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/455,481

(22) Filed: Jun. 19, 2006

(65) Prior Publication Data

US 2006/0284496 A1 Dec. 21, 2006

(30) Foreign Application Priority Data

Jun. 21, 2005 (JP) .............................. 2005-180544

(51) Int. Cl.
*H02K 37/12* (2006.01)
(52) U.S. Cl. ..................................... 310/49 R; 310/80
(58) Field of Classification Search .............. 310/49 R, 310/80, 12
See application file for complete search history.

(56) References Cited

U.S. PATENT DOCUMENTS

| | | | |
|---|---|---|---|
| 4,410,247 A * | 10/1983 | Hirata et al. .............. | 352/91 S |
| 4,922,274 A * | 5/1990 | Yamamoto et al. ......... | 396/508 |
| 5,130,851 A | 7/1992 | Shirie | |
| 5,150,260 A * | 9/1992 | Chigira ....................... | 359/694 |
| 5,225,941 A * | 7/1993 | Saito et al. .................. | 359/824 |
| 5,264,747 A * | 11/1993 | Kawamura ................ | 310/49 R |
| 5,377,048 A * | 12/1994 | Tada et al. ................... | 359/823 |
| 5,391,866 A * | 2/1995 | Hoshino et al. ......... | 250/201.2 |
| 5,717,530 A * | 2/1998 | Kawamoto et al. ......... | 359/822 |
| 5,748,394 A * | 5/1998 | Shimazaki et al. ......... | 359/823 |
| 5,815,325 A * | 9/1998 | Johnson ...................... | 359/696 |
| 5,831,356 A * | 11/1998 | Aoshima .................... | 310/49 R |
| 5,937,215 A * | 8/1999 | Mogamiya .................... | 396/85 |
| 6,249,495 B1 * | 6/2001 | Okada et al. ............. | 369/44.28 |
| 6,255,749 B1 * | 7/2001 | Aoshima et al. .......... | 310/49 R |
| 6,392,827 B1 * | 5/2002 | Ueyama et al. ............. | 359/824 |
| 6,570,717 B1 * | 5/2003 | Tu et al. ..................... | 359/696 |
| 6,654,557 B2 * | 11/2003 | Kikuchi et al. ............. | 396/144 |

FOREIGN PATENT DOCUMENTS

| | | |
|---|---|---|
| JP | 03-198033 A | 8/1991 |
| JP | 03-210543 A | 9/1991 |
| JP | 2005-057903 A | 3/2005 |

* cited by examiner

*Primary Examiner*—Darren E. Schuberg
*Assistant Examiner*—Alex W Mok
(74) *Attorney, Agent, or Firm*—Canon U.S.A. Inc., I.P. Division

(57) ABSTRACT

A driving apparatus includes a stepping motor having a lead screw, a rack, and a rack-retaining bar, a barrel, a barrel-retaining bar, and a connecting spring for connecting the rack to the barrel. The connecting spring includes an engaging portion that engages with a spherical output member of the rack. The stepping motor in which the lead screw and the rack are integrated with each other and the barrel are connected to each other with provides a structure that absorbs relative positioning error and backlash.

10 Claims, 11 Drawing Sheets

DRIVING APPARATUS

BACKGROUND OF THE INVENTION

1. Field of the Invention

The present invention relates to a driving apparatus for driving an optical component or the like using a motor.

2. Description of the Related Art

As a first conventional example, a motor that has a reduced dimension in a direction of a rotating shaft and provides an improved output has been suggested in, for example, Japanese Patent Laid-Open No. 2004-242453.

FIG. 10 is an exploded perspective view illustrating the motor of the first conventional example, and FIG. 11 is a longitudinal sectional view of the motor shown in FIG. 10.

Referring to FIGS. 10 and 11, the motor of the first conventional example includes a cylindrical magnet 106 divided into N portions along the circumferential direction, the N portions being alternately polarized to different poles; a rotor shaft 107 fixed to the inner periphery of the magnet 106 and made of soft magnetic material; a first coil 102 disposed adjacent to the magnet 106 in an axial direction from the rotor shaft 107; a first outer magnetic-pole portion 101a that is excited by the first coil 102, that extends through the inner periphery of the first coil 102, and that is disposed so as to face an outer peripheral surface of the magnet 106 in a predetermined angular range in such a manner that a gap is provided between the first outer magnetic-pole portion 101a and the outer peripheral surface of the magnet 106; and a second coil 104 disposed adjacent to the magnet 106 in the axial direction of the rotor shaft 107 on substantially the same plane as the first coil 102; and a second outer magnetic-pole portion 101b that is excited by the second coil 104, that extends through the inner periphery of the second coil 104, and that is disposed so as to face the outer peripheral surface of the magnet 106 in a predetermined angular range in such a manner that a gap is provided between the second outer magnetic-pole portion 101b and the outer peripheral surface of the magnet 106. The phase of the second outer magnetic pole unit 101b with respect to the polarized portions of the magnet 106 is shifted by (180/N) degrees from that of the first outer magnetic pole unit 101a. The first outer magnetic-pole portion 101a, the second outer magnetic-pole portion 101b, and a flat-plate portion 101c that connects the first outer magnetic pole unit 101a and the second outer magnetic pole unit 101b at one end thereof form an integrated stator 101. The rotor shaft 107 is rotatably retained by a bearing 110 attached to the stator 101 and a bearing 109 attached to a cover 108.

In this motor, the rotor shaft 107 is rotated by switching the energizing directions of the first coil 102 and the second coil 104 and changing the polarities of the first outer magnetic pole unit 101a and the second outer magnetic pole unit 101b.

In this motor, magnetic flux that is generated when the coils are energized flows from the outer magnetic-pole portions to the rotor shaft (inner magnetic-pole portions) through the magnet or from the rotor shaft (inner magnetic-pole portions) to the outer magnetic-pole portions through the magnet, and efficiently affects the magnet placed between the inner and outer magnetic-pole portions. In addition, since the rotor shaft functions as the inner magnetic-pole portions, it is not necessary to provide air gaps between the inner periphery of the magnet and the inner magnetic-pole portions. Therefore, the gaps between the outer magnetic-pole portions and the inner magnetic-pole portions can be set to a very small distance and the resistance of a magnetic circuit including the outer magnetic-pole portions and the inner magnetic-pole portions can be reduced. Accordingly, a large amount of magnetic flux can be generated with a small amount of current and the output can be improved. In addition, the first coil and the second coil are arranged adjacent to the magnet on substantially the same plane, and the first outer magnetic-pole portion and the second outer magnetic-pole portion are disposed so as to face the same magnet in different angular ranges. Therefore, the size of the magnet can be reduced in the axial direction and a motor with a reduced dimension in the axial direction can be provided. In addition, since the two outer magnetic-pole portions are formed integrally, error in the relative position between the two outer magnetic-pole portions can be reduced and the number of components can be also be reduced. Accordingly, a low-cost motor having a simple structure can be provided.

However, in the above-mentioned first conventional example, a mechanism for driving an optical component or the like is not particularly discussed.

On the other hand, as a second conventional example, a displacement apparatus that drives a driven member using a motor has been suggested in, for example, Japanese Utility Model Laid Open No. 2-71155.

In this apparatus, an engaging member that meshes with a screw shaft connected to the motor is attached to the driven member with a connecting member that has rigidity in a direction in which the driven member is driven and flexibility in a direction perpendicular to the moving direction of the driven member. The driven member follows the engaging member without backlash in the direction in which the driven member is driven. In addition, even when there is a parallel error between the screw shaft and guide members that retain the driven member, the error can be absorbed by bending the connecting member.

In addition, as a third conventional example, a lens-driving apparatus that drives a lens using a motor has been suggested in, for example, Japanese Patent No. 2890689.

The lens-driving apparatus includes a lens frame that holds a lens; first guiding means including two guide poles for holding the lens frame such that the lens frame can move along an optical axis; a drive shaft having a feed screw and integrated with a motor shaft; a driving piece having a notched nut that meshes with the feed screw on the drive shaft within a range of 180° or less along the circumference; and second guiding means including a single guide pole that is disposed on a motor attachment member and that holds the driving piece such that the driving piece can slide parallel to the drive shaft and rotate. The driving piece has an arm that functions as means for pinching the drive shaft. The driving piece and the lens frame are engaged with each other by insertion without a gap in the direction of the optical axis and with a gap in a direction perpendicular to the optical axis. When the drive shaft rotates, the driving piece and the lens frame are driven together along the optical axis, and the lens is moved accordingly.

In the above-described second conventional example, although the motor and the guide members must be attached to another member, explanations of such an attachment structure are not provided. In addition, the engaging member and the driven member are attached to each other with the connecting member, and a linear driving mechanism cannot be structured without the driven member. More specifically, when the driven member is newly designed, the linear driving mechanism must also be newly designed. Therefore, there is a heavy design load and it is difficult to apply this structure to devices with short product cycles.

In comparison, in the above-described third conventional structure, a linear driving mechanism can be structured without the lens and the lens frame, which correspond to the driven member in the second conventional example. The linear driving mechanism can be obtained as a unit including the motor, the drive shaft having the feed screw and integrated with the motor, the driving piece, and the second guiding means. Even when the lens and the lens frame are newly designed, the unit that functions as the linear driving mechanism can be used without any change.

In the third conventional example, the driving piece and the lens frame are engaged with each other by insertion without a gap in the direction of the optical axis and with a gap in the direction perpendicular to the optical axis. For engagement in the optical direction, a predetermined urging force that can overpower the weight of the lens and the lens frame must be provided to eliminate the backlash after insertion. In addition, the motor unit must be attached to the lens frame from a direction perpendicular to the optical axis of the lens frame. However, if the insertion position is even slightly shifted from the final attachment position in the left-right direction, a twisting force is applied to the member that generates the urging force along the optical axis after the assembly, which affects the movement of the lens frame and the transmission of load.

SUMMARY OF THE INVENTION

The present invention is directed to a driving apparatus that smoothly drives a driven member with high accuracy using a small, low-cost, high-power stepping motor having a small dimension in an axial direction.

According to an embodiment of the present invention, a driving apparatus includes a stepping motor including a rotor that is capable of rotating about a rotational axis, a lead screw that rotates together with the rotor, and a rack that meshes with the lead screw and includes an output member having an end portion that is convex or at least partially spherical; a guide member provided parallel to the lead screw; a driven member that is retained by the guide member and capable of moving linearly; and a spring member attached to the driven member and connecting the rack to the driven member, the spring member including an engaging portion that urges the end portion of the output member against the driven member.

A direction in which the spring member urges the end portion of the output member may be substantially the same as a direction in which the driven member is driven.

In addition, the engaging portion of the spring member may include a circular hole or recess. In addition, the spring member may be attached to the driven member such that a position at which the spring member is attached is adjustable in a direction perpendicular to the direction in which the driven member is driven.

In addition, the stepping motor may include a stator having a first outer magnetic-pole portion and a second outer magnetic-pole portion that extend along the rotational axis and that are integrated with the stator at both ends of the stator; the rotor being made of soft magnetic material, that is disposed between the first outer magnetic-pole portion and the second outer magnetic-pole portion, and being rotatably retained by the stator at an end of the rotor with the lead screw interposed between the rotor and the stator, and having a magnet attached to the outer periphery of the rotor; and a first coil and a second coil wound around the first outer magnetic-pole portion and the second outer magnetic-pole portion, respectively, in a region between the magnet and the stator along the rotational axis of the rotor.

In addition, the driving apparatus may further include a retaining member fixed to the stator so as to cover an end portion of the magnet and retaining an end portion of the lead screw such that the lead screw can rotate; and a rack-retaining bar that is attached to the retaining member and that supports the rack such that the rack is moveable in a direction parallel to an axis of the lead screw.

According to the above-described structure, in the stepping motor used for driving, the magnet is fixed around the rotor placed between the first outer magnetic-pole portion and the second outer magnetic-pole portion. Therefore, the strength of the magnet is increased and inner magnetic-pole portions can be formed in the rotor. Therefore, it is not necessary to provide gaps between the magnet and the inner magnetic-pole portions and the magnetic resistance can be reduced. Accordingly, the output of the motor can be increased.

In addition, in the above-described stepping motor, only a gap along the outer periphery of the magnet is to be managed. Therefore, the assembly can be facilitated and the rate of defective motors can be reduced.

In addition, the first coil and the second coil are arranged adjacent to the magnet on substantially the same plane, and the first outer magnetic-pole portion and the second outer magnetic-pole portion are disposed so as to face the same magnet in different angular ranges. Therefore, the size of the magnet can be reduced in the axial direction and a motor with a reduced dimension in the axial direction can be provided.

In addition, since the two outer magnetic-pole portions are formed integrally, error in the relative position between the two outer magnetic-pole portions can be reduced and the number of components can be also be reduced. Accordingly, a low-cost motor having a simple structure can be provided.

In addition, in this stepping motor, the rotor is retained by the stator and the retaining member fixed to the stator. Therefore, displacement between the axes thereof can be reduced. In addition, gaps between the outer peripheral surface of the magnet and the inner peripheral surfaces of the first and second outer magnetic-pole portions can be made uniform so that stability of rotation of can be increased.

In addition, in the stepping motor, a linear driving mechanism is unitized, thereby providing high versatility.

The stepping motor and the driven member are connected to each other with the output member having a spherical end portion and the spring member having a hole. Therefore, error in the relative position between the stepping motor and the driven member can be absorbed and the driven member can be stably driven.

As a result, a driving apparatus that smoothly drives a driven member with high accuracy using a small, low-cost, high-power stepping motor having a small dimension in an axial direction is provided.

In addition, the spring member can be attached to the driven member from the same direction as a direction in which the driven member is attached to a retaining member thereof. Accordingly, the assembly can be facilitated.

In addition, the end portion of the output member can be urged against the driven member by the spring member without backlash and the spring member can be easily positioned.

In addition, even when the relative position between the motor and the driven member includes error in a direction perpendicular to the driving direction, the error can be absorbed by adjusting the position at which the spring member is attached to the driven member. Therefore, when the spring member is attached to the driven member such that the end portion of the output member of the rack is positioned between the spring member and the driven member, the driven member and the rack are prevented from receiving a twisting force that function as a drive load.

Further features of the present invention will become apparent from the following description of exemplary embodiments with reference to the attached drawings.

DESCRIPTION OF THE EMBODIMENTS

Embodiments of the present invention will be described below with reference to the accompanying drawings.

First Embodiment

Figure 1:
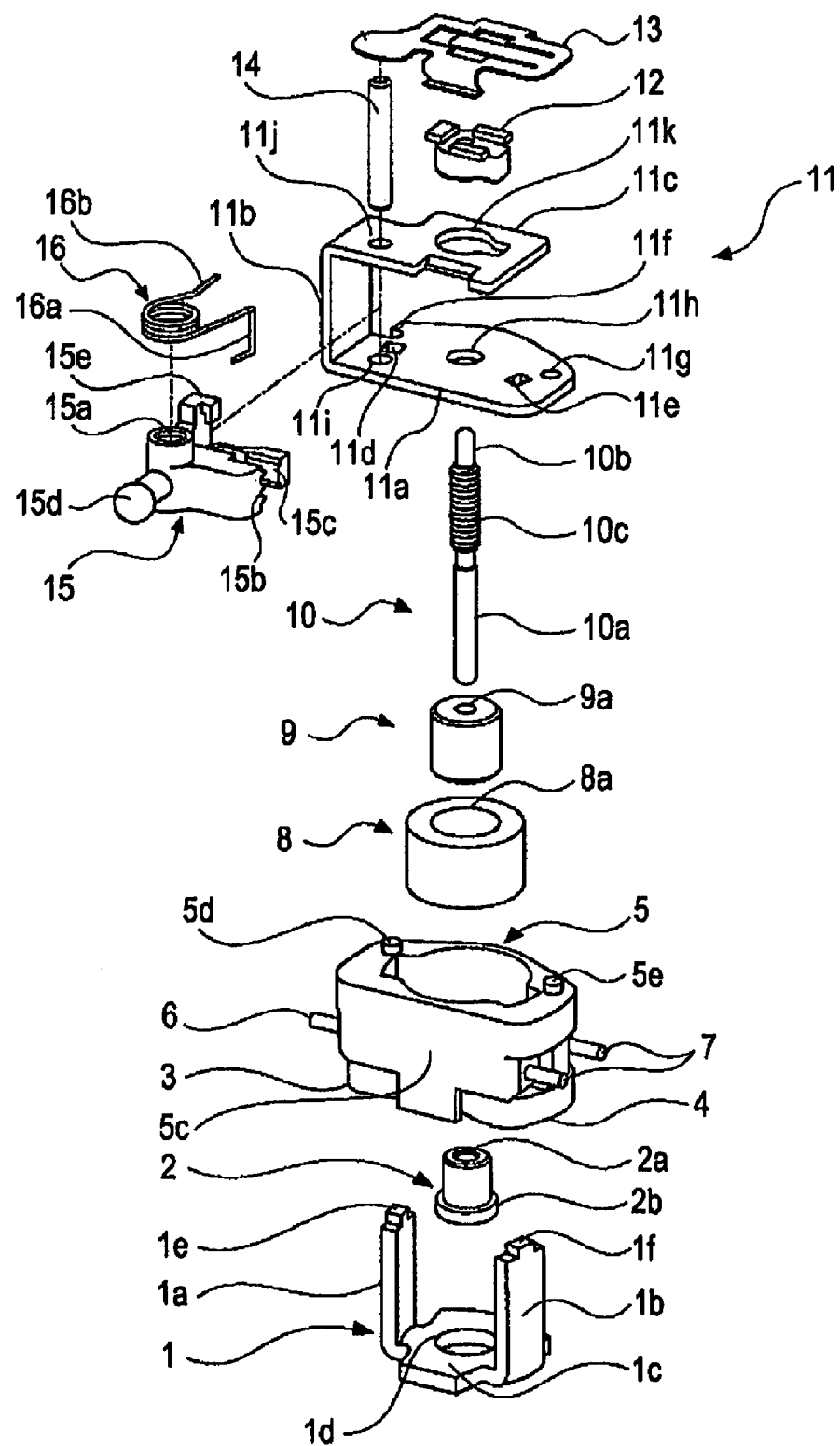
FIG. 1 is an exploded perspective view illustrating a stepping motor included in a driving apparatus according to an embodiment of the present invention.
Figure 2:
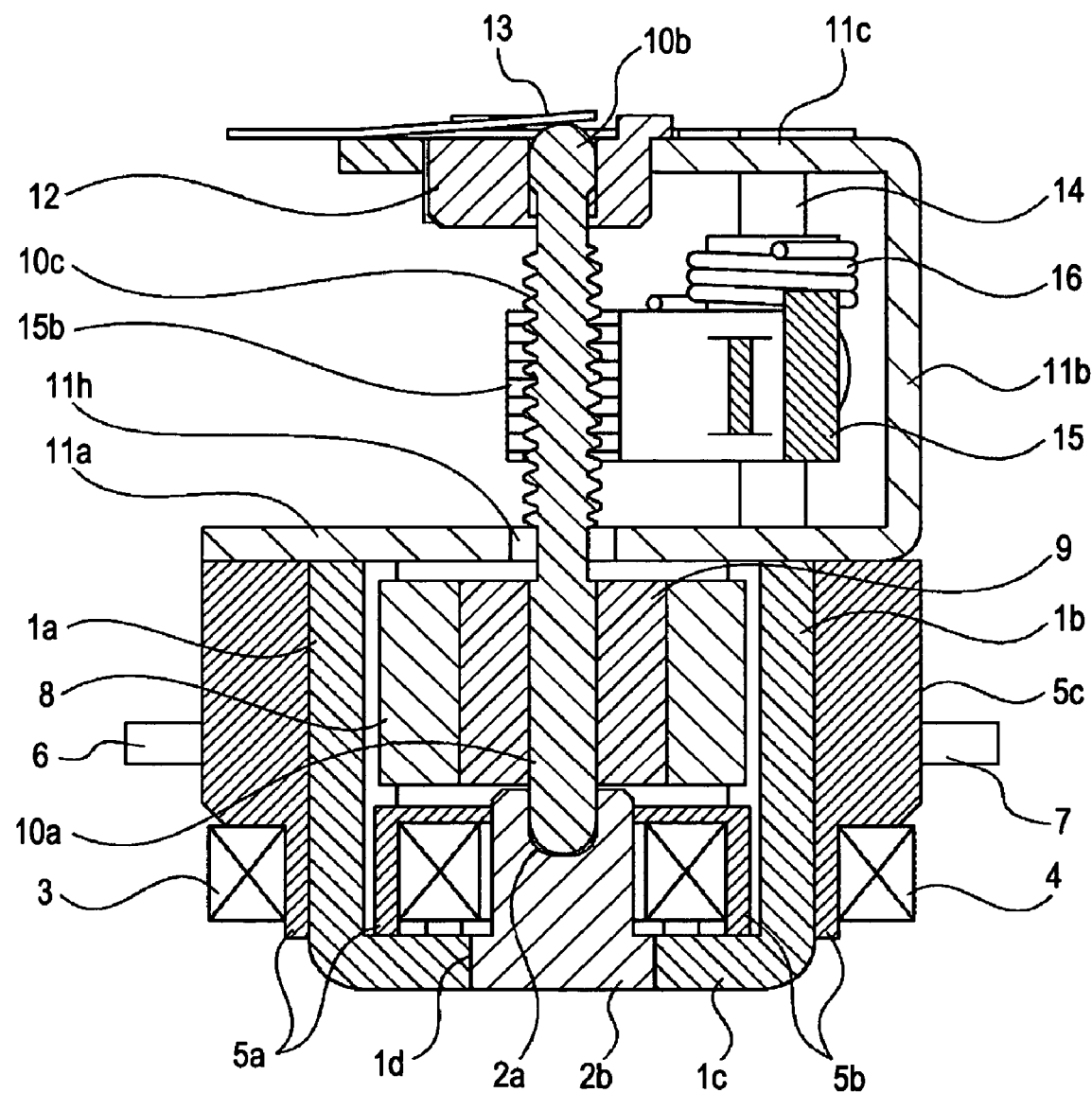
FIG. 2 is a longitudinal sectional view illustrating the stepping motor shown in FIG. 1 taken along a plane that passes through two coils included in the stepping motor.
Figure 3:
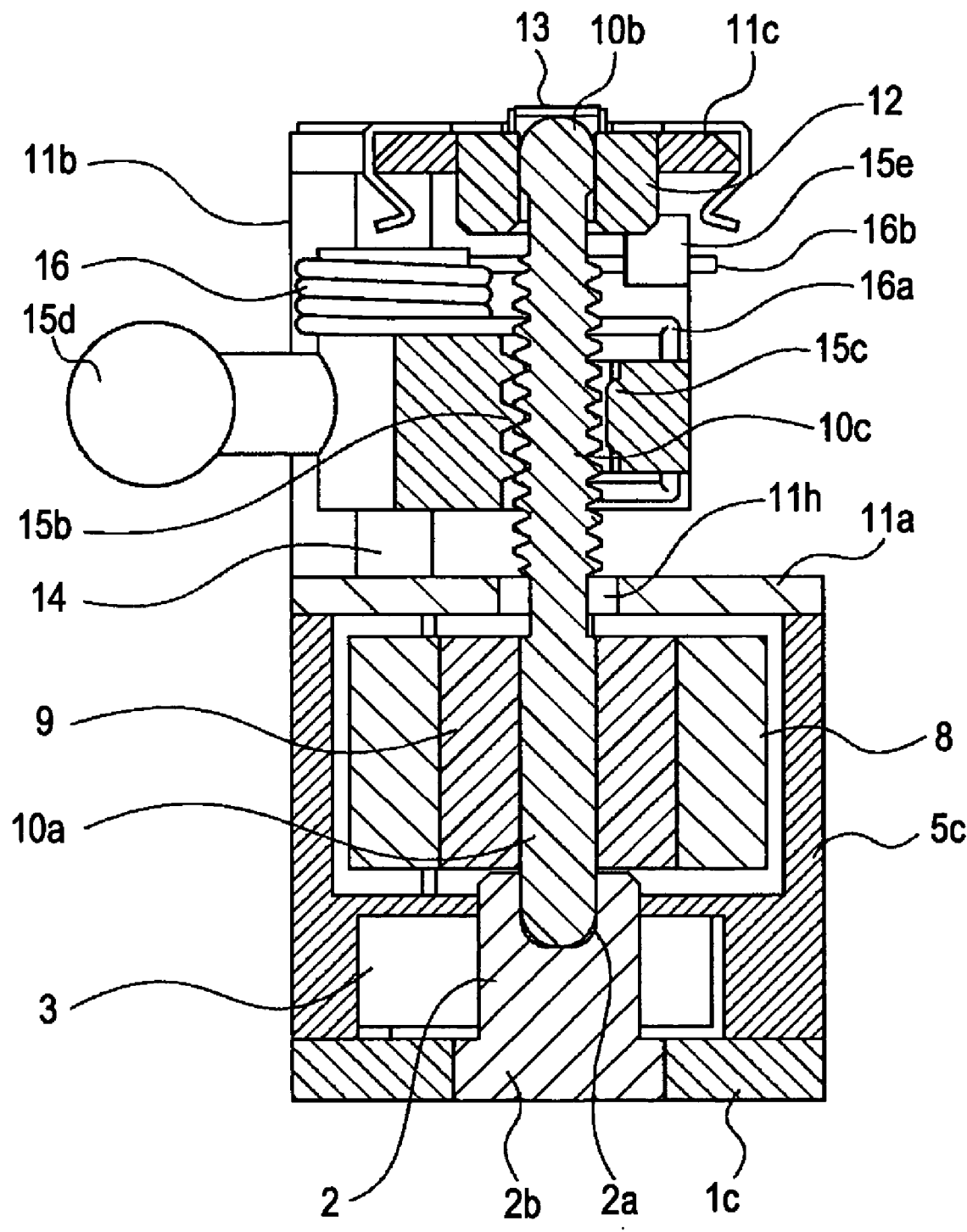
FIG. 3 is a longitudinal sectional view illustrating the stepping motor shown in FIG. 1 taken along a plane that passes between the two coils included in the stepping motor.

FIG. 1 is an exploded perspective view illustrating the structure of a stepping motor included in a driving apparatus according to a first embodiment of the present invention. FIG. 2 is a longitudinal sectional view illustrating the inner structure of the stepping motor in an assembled state taken along a plane that passes through two coils. FIG. 3 is a longitudinal sectional view illustrating the inner structure of the stepping motor in the assembled state taken along a plane that passes between the two coils.

Referring to FIGS. 1 to 3, the stepping motor includes a stator 1, a first bearing 2, a second bearing 12, a first coil 3, a second coil 4, a bobbin 5, a magnet 8, a core 9, a lead screw shaft 10, an angle member 11, and a rack 15.

The stator 1 is made of soft magnetic material and includes a first outer magnetic-pole portion 1a, a second outer magnetic-pole portion 1b, a flat-plate portion 1c, a hole 1d, and projections 1e and 1f. The flat-plate portion 1c is a plate-shaped portion having a bent shape with an opening angle θ (see FIG. 4). The hole 1d is formed at the center of the flat-plate portion 1c for receiving the first bearing 2. The first outer magnetic-pole portion 1a and the second outer magnetic-pole portion 1b have a comb-tooth shape and are formed integrally with the flat-plate portion 1c by being simply bent at both ends of the flat-plate portion 1c in such a manner that the first outer magnetic-pole portion 1a and the second outer magnetic-pole portion 1b are parallel to the lead screw shaft 10. The projections 1e and 1f are formed integrally with the first outer magnetic-pole portion 1a and the second outer magnetic-pole portion 1b, respectively, at the distal end thereof.

In the stator 1, the first outer magnetic-pole portion 1a and the second outer magnetic-pole portion 1b are formed integrally with the flat-plate portion 1c. Therefore, a relative error between the first outer magnetic-pole portion 1a and the second outer magnetic-pole portion 1b is small and differences in performance between stepping motors due to assembly can be reduced.

The first bearing 2 has a cylindrical shape and is made of soft magnetic material. The first bearing 2 has a shaft hole 2a with a predetermined depth at the center and a fixing portion 2b at one end of the first bearing 2 in the axial direction. The lead screw shaft 10 is fitted to the shaft hole 2a in the first bearing 2 and the fixing portion 2b is attached to the hole 1d formed in the stator 1. Thus, the lead screw shaft 10 is supported in a rotatable manner.

The bobbin 5 includes a first bobbin portion 5a, a second bobbin portion 5b, a cover portion 5c, and dowels 5d and 5e. The cover portion 5c is shaped such that the first outer magnetic-pole portion 1a and the second outer magnetic-pole portion 1b of the stator 1 can be fitted therein. The cover portion 5c is placed on the flat-plate portion 1c of the stator 1, covers the outer peripheral surface of the magnet 8, and forms a part of the outer shell of the stepping motor.

The first bobbin portion 5a is formed integrally with the cover portion 5c and the first coil 3 is wound around the first bobbin portion 5a. The first bobbin portion 5a has an opening to which the first outer magnetic-pole portion 1a is fitted at a position near the flat-plate portion 1c in the axial direction. The second bobbin portion 5b is formed integrally with the cover portion 5c and the second coil 4 is wound around the second bobbin 5b. The second bobbin portion 5b has an opening to which the second outer magnetic-pole portion 1b is fitted at a position near the flat-plate portion 1c in the axial direction.

Two terminal pins 6 (only one is shown) to which coil terminals of the first coil 3 are connected and two terminal pins 7 to which coil terminals of the second coil 4 are connected are provided at the longitudinal ends of the cover portion 5c of the bobbin 5. In addition, two dowels 5d and 5e that define the position at which the angle member 11 is attached are provided on the top surface of the cover portion 5c of the bobbin 5.

The first coil 3 is wound around the first bobbin portion 5a along the outer periphery of the first outer magnetic-pole portion 1a at a position between the magnet 8 and the flat-plate portion 1c of the stator 1 in the axial direction. The first coil 3 is energized by respectively connecting the coil terminals provided at both ends thereof to the above-mentioned two terminal pins 6 provided on the bobbin 5. Accordingly, the first outer magnetic-pole portion 1a of the stator 1 is excited by energizing the first coil 3.

The second coil 4 is wound around the second bobbin portion 5b along the outer periphery of the second outer magnetic-pole portion 1b at a position between the magnet 8 and the flat-plate portion 1c of the stator 1 in the axial direction. The second coil 4 is energized by respectively connecting the coil terminals provided at both ends thereof to the above-described two terminal pins 7 provided on the bobbin 5. Accordingly, the second outer magnetic-pole portion 1b of the stator 1 is excited by energizing the second coil 4.

The first coil 3 and the second coil 4 are placed adjacent to each other on the top surface of the flat-plate portion 1c of the stator 1. The lead screw shaft 10 and the first bearing 2 are disposed adjacent to each other at a position between the first coil 3 and the second coil 4. Accordingly, compared to the structure in which two coils and a magnet are arranged along an axial direction of a motor with gaps therebetween, the dimension of the stepping motor in the axial direction thereof can be reduced.

The magnet 8 has a cylindrical shape and has an inner peripheral portion 8a to which the core 9 can be fitted. The magnet 8 is divided into N portions (N is the number of poles) along the circumferential direction, the N portions being alternately polarized to S and N poles. In the present embodiment, the magnet 8 is divided into six poles (the number of poles is six) which are alternately polarized to S and N poles (see FIG. 4). The inner peripheral surface of the magnet 8 is either a) polarized so as to have a weaker polarization distribution than that of the outer peripheral surface, b) completely unpolarized, or c) polarized to the pole opposite to that of the outer peripheral surface (for example to be a N pole if the outer peripheral surface is polarized to be a S pole).

The core 9 has a cylindrical shape and is made of soft magnetic material. The core 9 has a hole 9a to which the lead screw shaft 10 can be fitted and is fixed to the inner peripheral portion 8a of the magnet 8 by adhesion or the like. The magnet 8 and the core 9 have the same dimension in the axial direction, and are fixed to each other such that end faces thereof are flush with each other at both ends in the axial direction.

The lead screw shaft 10 is made of soft magnetic material and includes a first shaft section 10a, a second shaft section 10b, and an external threaded section 10c. The first shaft section 10a is fitted and fixed to the hole 9a in the core 9 with an end portion protruding therefrom, the end portion having a convex or hemispherical shape and being rotatably retained by the first bearing 2. The second shaft section 10b has a convex or hemispherical end portion that is rotatably supported by the second bearing 12. The external thread section 10c meshes with projections 15b on the rack 15, which will be described below, so that the rack 15 is moved linearly in the axial direction when the lead screw shaft 10 rotates.

The angle member 11 includes a flat top plate portion 11a, an arm portion 11b, and a retaining portion 11c that are formed integrally with each other. The top plate portion 11a has holes 11d and 11e, positioning portions 11f and 11g, and holes 11h and 11i. The retaining portion 11c has holes 11j and 11k.

The projection 1e provided at the end of the first outer magnetic-pole portion 1a of the stator 1 and the projection 1f provided at the end of the second outer magnetic-pole portion 1b of the stator 1 are respectively inserted into the holes 11d and 11e formed in the top plate portion 11a and are fixed in place, for example by laser welding, caulking, etc. The arm portion 11b is formed integrally with the top plate portion 11a by bending along an edge of the top plate portion 11a at a right angle (in a direction parallel to the lead screw shaft 10 in the assembled state). The retaining portion 11c is formed integrally with the arm portion 11b by bending along an edge of the arm portion 11b at a right angle (in a direction parallel to the top plate portion 11a).

The top plate portion 11a is fixed to the stator 1 in such a manner that the bobbin 5 is held between the top plate portion 11a and the stator 1. The dowels 5d and 5e on the bobbin 5 are respectively fitted to the positioning portions 11f and 11g of the top plate portion 11a, thereby positioning the bobbin 5 with respect to the top plate portion 11a. The hole 11h is formed at approximately the center of the top plate portion 11a and has a diameter larger than the outer diameter of the lead screw shaft 10c of the lead screw shaft 10.

In the present embodiment, the lead screw shaft 10 and the core 9 are provided as separate components and are fixed to each other. However, the lead screw shaft 10 and the core 9 may also be formed integrally with each other as a single component. When the lead screw shaft 10 and the core 9 are provided as separate components, the lead screw shaft 10 can be made of a material like SUS according to Japanese Industrial Standard (JIS) that is strong and has high wear resistance and the core 9 can be made of soft magnetic material, such as SUY according to JIS, that provides high magnetic efficiency. When the lead screw shaft 10 and the core 9 are formed integrally with each other as a single component, the cost can be reduced since the number of components is reduced. In addition, the coaxiality between the core 9 and the lead screw shaft 10 can be increased.

The second bearing 12 is attached to the hole 11k formed in the retaining portion 11c of the angle member 11. The second bearing 12 retains the second shaft section 10b of the lead screw shaft 10 in a rotatable manner.

A shaft-pressing spring 13 is attached to the retaining portion 11c of the angle member 11. The convex or hemispherical end portion of the second shaft portion 10b of the lead screw shaft 10 is urged by the shaft-pressing spring 13 such that the lead screw shaft 10 is biased in the axial direction. The shaft-pressing spring 13 also serves to prevent the rack-retaining bar 14 from being released.

The rack-retaining bar 14 is attached to the hole 11i formed in the top plate portion 11a and the hole 11j formed in the retaining portion 11c of the angle member 11 and supports the rack 15 in a rotatable manner.

The rack 15 has a shaft hole 15a, the projections 15b, an arm 15c, an output member 15d, and a spring attachment 15e. The rack-retaining bar 14 is inserted through and fitted to the shaft hole 15a. The projections 15b mesh with the external thread portion 10c of the lead screw shaft 10. The arm 15c has a spring characteristic and holds the external thread section 10c of the lead screw shaft 10 between the arm 15c and the projections 15b. A first end 16a of a rack-pressing spring 16 is attached to the arm 15c. The output member 15d has a convex or spherical shape at an end thereof, and transmits the rotation of the lead screw shaft 10 to an external component as a driving force. A second end 16b of the rack-pressing spring 16 is attached to the spring attachment 15e.

The first end 16a of the rack-pressing spring 16 is attached to the arm 15c of the rack 15, and the second end 16b of the rack-pressing spring 16 is attached to the spring attachment 15e of the rack 15. Accordingly, the rack-pressing spring 16 presses the projections 15b of the rack 15 against the external thread section 10c of the lead screw shaft 10.

The lead screw shaft 10 is positioned in the axial direction by bringing the hemispherical end portion of the first shaft section 10a into contact with the bottom surface of the hole 2a that is formed in the first bearing 2. Accordingly, the lead screw shaft 10 is prevented from being shifted in the axial direction while the lead screw shaft 10 rotates and the feeding accuracy of the rack 15, which meshes with the external thread portion 10c of the lead screw shaft 10, in the axial direction is increased. The shaft-pressing spring 13 also prevents the second bearing 12 from being released from the hole 11k formed in the angle member 11.

The first outer magnetic-pole portion 1a and the second outer magnetic-pole portion 1b of the stator 1 face the outer peripheral surface of the magnet 8 with gaps provided therebetween. A portion of the core 9 that faces the first outer magnetic-pole portion 1, the lead screw shaft 10, and the first bearing 2 form a first inner magnetic-pole portion. Similarly, a portion of the core 9 that faces the second outer magnetic-pole portion 1b, the lead screw shaft 10, and the first bearing 2 form a second inner magnetic-pole portion.

Accordingly, when the first coil 3 is energized, the first outer magnetic-pole portion 1a and the first inner magnetic-pole portion are excited to the opposite poles so that magnetic flux that passes through the magnet 8 is generated between the magnetic poles and the magnet 8. Similarly, when the second coil 4 is energized, the second outer magnetic-pole portion 1b and the second inner magnetic-pole portion are excited to the opposite poles so that magnetic flux that passes through the magnet 8 is generated between the magnetic poles and the magnet 8.

In the present embodiment, it is not necessary to provide an air gap between the inner periphery of the magnet 8 and the core 9 that forms the inner magnetic-pole portions in the magnet 8. Therefore, the distance between the first outer magnetic-pole portion 1a and the core 9 and the distance between the second outer magnetic-pole portion 1b and the core 9 can be reduced. As a result, the magnetic resistance of a magnetic circuit including the first coil 3, the first outer magnetic-pole portion 1a, and the first inner magnetic-pole portion and a magnetic circuit including the second coil 4, the second outer magnetic-pole portion 1b, and the second inner magnetic-pole portion can be reduced. Accordingly, the output of the stepping motor can be increased.

In the present embodiment, the first inner magnetic-pole portion and the second inner magnetic-pole portion are formed by the core 9, the lead screw shaft 10, and the first bearing 2. Thus, the rotor also functions as the inner magnetic-pole portions. Therefore, the manufacturing cost can be reduced. In addition, the stator 1 is formed simply by bending the first outer magnetic-pole portion 1a and the second outer magnetic-pole portion 1b in a direction perpendicular to the flat-plate portion 1c. Therefore, the stator 1 can be easily manufactured and the manufacturing cost can be reduced.

In the present embodiment, since the magnet 8 is fixed to the outer periphery of the core 9, as shown in FIG. 2, the magnet 8 has high mechanical strength. In addition, the core 9 functions as back metal that reduces the magnetic resistance between the S and N poles in the inner peripheral portion of the magnet 8. Accordingly, the permeance coefficient of the magnetic circuits is increased. Therefore, even when the stepping motor is used in high-temperature environment, magnetic degradation due to demagnetization can be reduced.

In the present embodiment, only a gap along the outer periphery of the magnet 8 is to be managed. Therefore, the components of the stepping motor can be easily assembled.

In addition, in the present embodiment, the first outer magnetic-pole portion 1a and the second outer magnetic-pole portion 1b of the stator 1 have a comb-tooth shape and extend in the axial direction of the stepping motor. Therefore, the maximum outer diameter of the stepping motor (L1 in FIG. 4) can be reduced.

For example, if the outer magnetic-pole portions are formed of stator plates that extend in the radial direction of the magnet, the magnet must be formed in a planar shape and the coils are wound in the radial direction. Therefore, even though the dimension of the stepping motor can be reduced in the axial direction, the maximum outer diameter thereof is increased.

In comparison, according to the present embodiment, the maximum outer diameter of the stepping motor (L1 in FIG. 4) is determined from the diameter of the magnet 8, the thickness of the first outer magnetic-pole portion 1a and the second outer magnetic-pole portion 1b, and the winding width of the first coil 3 and the second coil 4. With regard to the winding width, portions of the first and second coils 3 and 4 that are adjacent to the first bearing 2 are at substantially the same position as the magnet 8 in the radial direction. Therefore, the maximum outer diameter of the stepping motor can be reduced.

In the present embodiment, the first outer magnetic-pole portion 1a and the second outer magnetic-pole portion 1b are formed in a comb-tooth shape that extends in the axial direction of the motor. Therefore, the first coil 3, the second coil 4, the magnet 8, and the rotor including the core 9 and the lead screw shaft 10 can all be assembled from one direction (from above in FIG. 1). Accordingly, the assembly can be facilitated.

In addition, according to the present embodiment, both of the first coil 3 and the second coil 4 are wound in the bobbin 5 and the bobbin 5 serves also as a cover for covering the outer peripheral surface of the magnet 8. Therefore, compared to the case in which the first and second coils are wound around different bobbins or the case in which the cover is provided as a separate component, the number of components and the cost can be reduced.

In addition, according to the present embodiment, the minimum outer diameter of the stepping motor (L2 in FIG. 4) is determined only from the diameter of the magnet 8 and the thickness of the cover portion 5c of the bobbin 5. Therefore, the minimum outer diameter of the stepping motor (L2 in FIG. 4) can be set to a value close to the outer diameter of the magnet 8. Thus, the minimum outer diameter of the stepping motor can be easily reduced.

In addition, according to the present embodiment, the angle member 11 serves all of the functions of retaining the lead screw shaft 10, covering an end face of the magnet 8 in the axial direction, and fixing the bobbin 5 between the angle member 11 and the stator 1.

Accordingly, compared to a structure in which an angle member is additionally attached to a stepping motor afterwards, the number of components and the cost can be reduced. In addition, the dimension of the stepping motor in the axial direction thereof can be further reduced.

In addition, in the present embodiment, the lead screw shaft 10 is retained by the stator 1 and the angle member 11 that is fixed to the stator 1. Therefore, the shift in coaxiality of the two retaining members can be reduced. In addition, the gaps between the outer peripheral surface of the magnet 8 and the inner peripheral surfaces of the first outer magnetic pole portion 1a and the second outer magnetic pole portion 1b can be made uniform so that stability of rotation of the stepping motor can be increased.

In addition, in the present embodiment, the lead screw shaft 10 is a rotating shaft of the stepping motor. Therefore, unlike the structure in which, for example, a lead screw shaft is provided separately from a rotating shaft, it is not necessary to connect the lead screw shaft to a rotating shaft. Accordingly, the center displacement that occurs when the lead screw shaft and the rotating shaft are bonded together can be avoided. Thus, the stability of rotation of the stepping motor can be increased and the cost can be considerably reduced.

In addition, in the present embodiment, the stepping motor includes the rack 15 that meshes with the lead screw shaft 10 and the rack-retaining bar 14. Therefore, the rotation of the magnet 8 can be converted into the movement of the rack 15 in the axial direction when it is output via the lead screw shaft 10. Therefore, step control of a linear movement of, for example, a lens can be performed by the stepping motor of the present embodiment without using an additional mechanism, such as a speed reducer. In other words, a linear driving mechanism can be unitized. Thus, the structure of the present embodiment has high versatility.

Next, the features and operation of the stepping motor included in the driving apparatus according to the present embodiment will be described below with reference to FIGS. 4 to 7.

First, the features of the stepping motor will be described.

Figure 4:
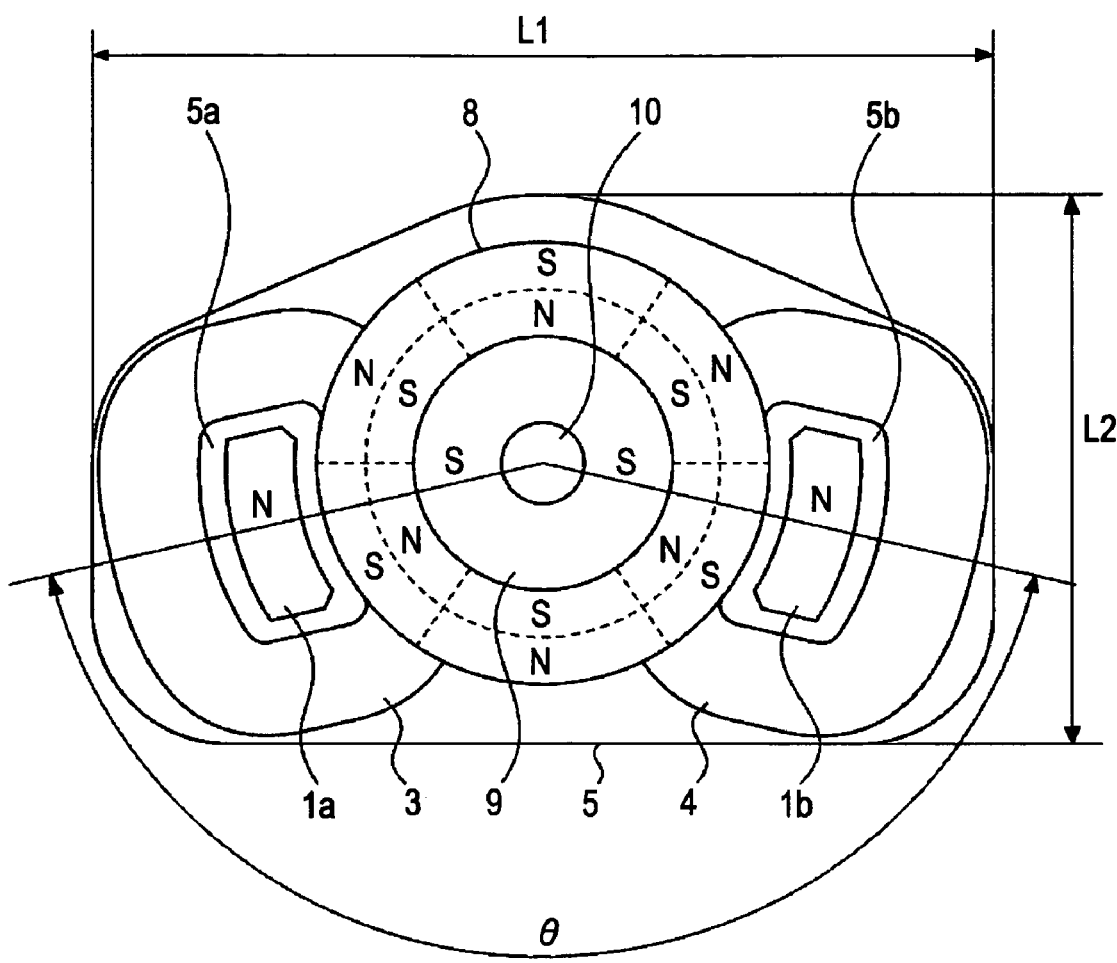
FIG. 4 is a top view illustrating the inner structure of the stepping motor shown in FIG. 1 in a first energized state.
Figure 5:
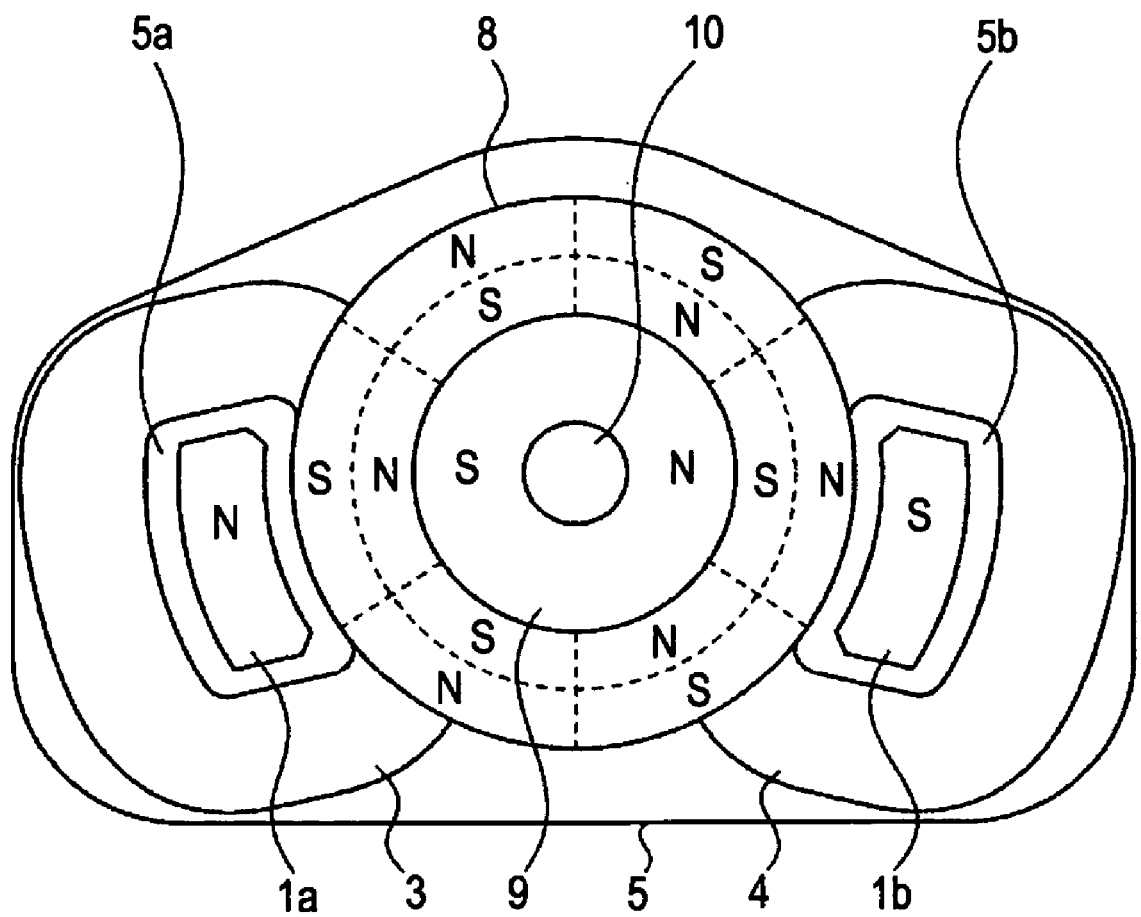
FIG. 5 is a top view illustrating the inner structure of the stepping motor shown in FIG. 1 in a second energized state.
Figure 6:
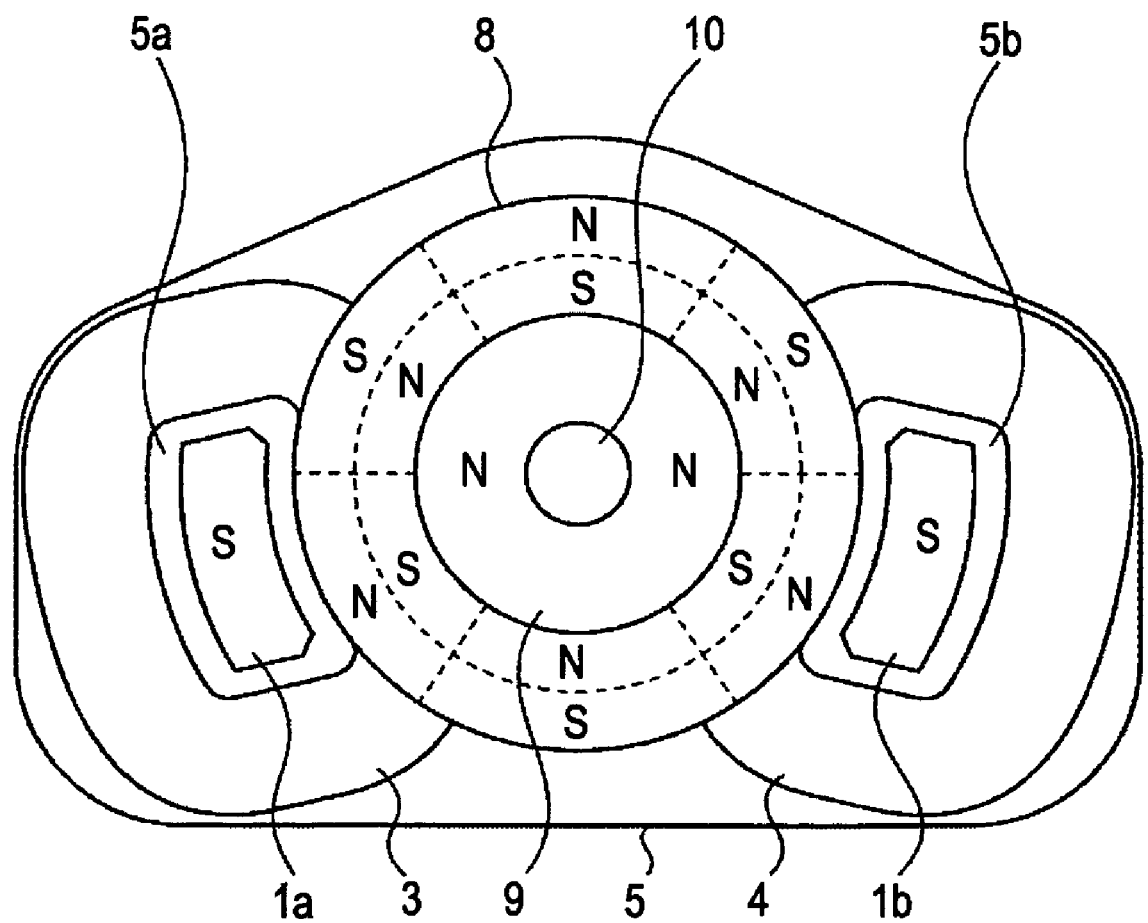
FIG. 6 is a top view illustrating the inner structure of the stepping motor shown in FIG. 1 in a third energized state.
Figure 7:
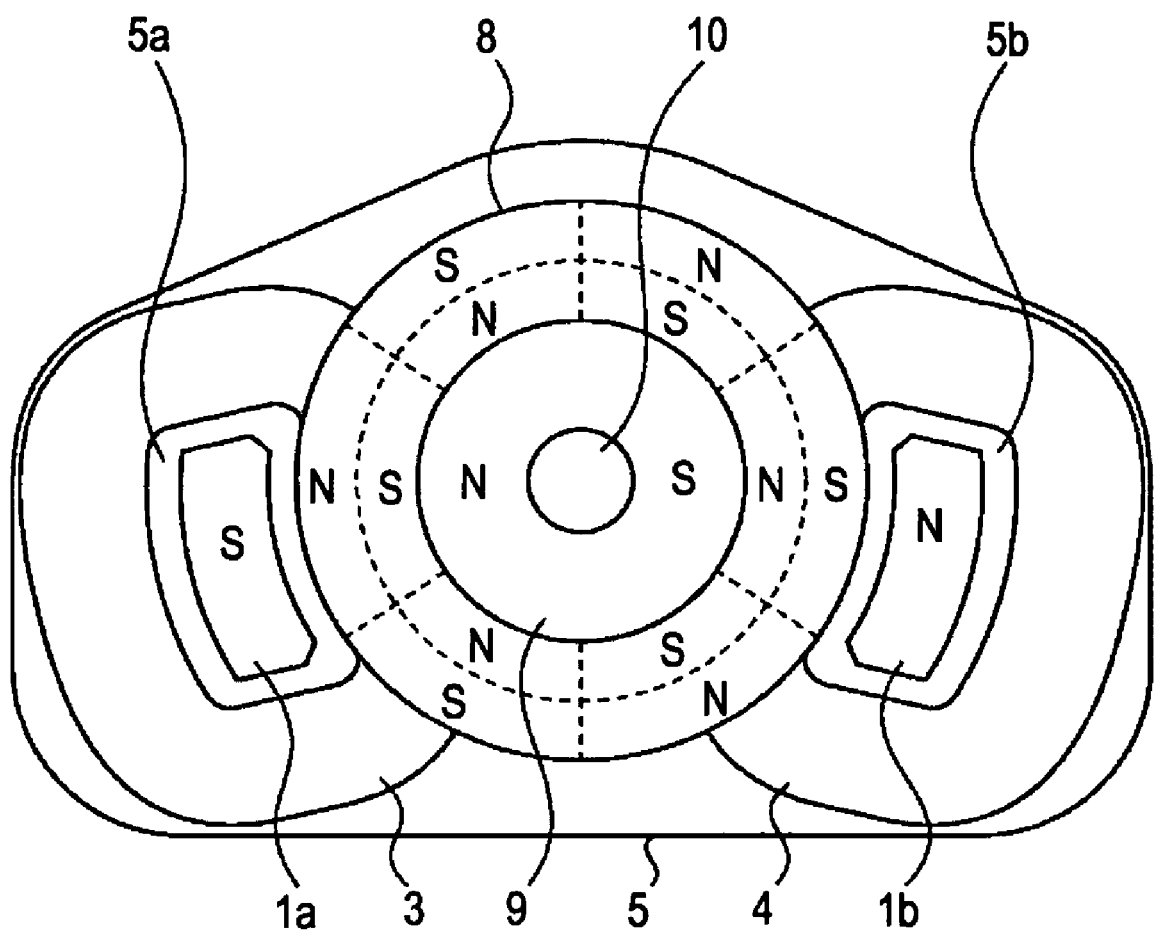
FIG. 7 is a top view illustrating the inner structure of the stepping motor shown in FIG. 1 in a fourth energized state.

FIG. 4 is a top view illustrating the stepping motor in a first energized state. FIG. 5 is a top view illustrating the stepping motor in a second energized state. FIG. 6 is a top view illustrating the stepping motor in a third energized state. FIG. 7 is a top view illustrating the stepping motor in a fourth energized state.

Referring to FIGS. 4 to 7, the outer peripheral surface and the inner peripheral surface of the magnet 8 are divided into a plurality of portions (six portions in the present embodiment) along the circumferential direction at a constant angular interval, the portions being alternately polarized to S and N poles. A portion along the inner peripheral surface that corresponds to a portion along the outer peripheral surface that is polarized to S pole is polarized to N pole. In reverse, a portion along the inner peripheral surface that corresponds to a portion along the outer peripheral surface that is polarized to N pole is polarized to S pole.

As shown in FIG. 4, the first outer magnetic-pole portion 1a and the second outer magnetic-pole portion 1b of the stator 1 are arranged such that the phases thereof are shifted from each other by θ around the rotational center of the magnet 8. Here, θ is determined as (180°−180°/N) where N is the division number. Since N is 6 in the present embodiment, θ is calculated as 150°. When θ is set to (180°−180°/N), the dimension L2 shown in FIG. 4 (the minimum outer diameter of the stepping motor) can be reduced.

As described above, the first outer magnetic-pole portion 1a and the second outer magnetic-pole portion 1b of the stator 1 face the same surface (i.e., the outer peripheral surface) of the magnet 8 in a direction perpendicular to the axial direction in different angular ranges (at positions shifted from each other by θ). Therefore, the dimension of the magnet 8 can be reduced in the axial direction, and the dimension of the stepping motor can also be reduced in the axial direction.

As a significant feature of the above-mentioned structure, when a certain portion along the outer peripheral surface of the magnet 8 is considered, the portion is alternately affected by the magnetic flux generated by the first outer magnetic pole portion 1a that is excited by the first coil 3 and the magnetic flux generated by the second outer magnetic pole portion 1b that is excited by the second coil 4 as the magnet 8 rotates. Since the first outer magnetic-pole portion 1a and the second outer magnetic-pole portion 1b generate the magnetic flux so as to affect the same portion of the magnet 8, adverse affects due to polarization variation or the like can be prevented and the performance of the stepping motor can be ensured.

Next, the operation of the stepping motor will be described below.

In the state shown in FIG. 4, the first coil 3 is energized in a forward direction so that the first outer magnetic-pole portion 1a is excited to N pole and the first inner magnetic-pole portion (a portion of the core 9 that faces the first outer magnetic-pole portion 1a) is excited to S pole. In addition, the second coil 4 is energized in the forward direction so that the second outer magnetic-pole portion 1b is excited to N pole and the second inner magnetic-pole portion (a portion of the core 9 that faces the second outer magnetic-pole portion 1b) is excited to S pole (first energized state).

Next, the state shown in FIG. 4 is changed such that only the energizing direction of the second coil 4 is reversed so that the second outer magnetic-pole portion 1b is excited to S pole and the second inner magnetic-pole portion is excited to N pole. Accordingly, as shown in FIG. 5, the magnet 8 is rotated clockwise by 30° (second energized state).

Next, the state shown in FIG. 5 is changed such that the energizing direction of the first coil 3 is reversed so that the first outer magnetic-pole portion 1a is excited to S pole and the first inner magnetic-pole portion is excited to N pole. Accordingly, as shown in FIG. 6, the magnet 8 is further rotated clockwise by 30° (third energized state).

Next, the state shown in FIG. 6 is changed such that only the energizing direction of the second coil 4 is returned to forward so that the second outer magnetic-pole portion 1b is excited to N pole and the first inner magnetic-pole portion is excited to S pole. Accordingly, as shown in FIG. 7, the magnet 8 is further rotated clockwise by 30° (fourth energized state).

Similarly, the energizing directions of the first coil 3 and the second coil 4 are successively switched so that the first outer magnetic-pole portion 1a and the second outer magnetic-pole portion 1b are excited to S and N poles at different timings. Accordingly, the magnet 8 is rotated to a position corresponding to the energizing phase.

As described above, according to the present embodiment, the first coil 3 and the second coil 4 are both energized in the forward direction in the first energized state. In the second energized state, the first coil 3 is energized in the forward direction and the second coil 4 is energized in the reverse direction. In the third energized state, the first coil 3 and the second coil 4 are both energized in the reverse direction. In the fourth energized state, the first coil 3 is energized in the reverse direction and the second coil 4 is energized in the forward direction. Thus, the energized state is switched to the first energized state, the second energized state, the third energized state, and the fourth energized state, in that order, so as to rotate the magnet 8.

The energized state can also be switched in the following manner. That is, in a fifth energized state, the first coil 3 and the second coil 4 are both energized in the forward direction. In a sixth energized state, the first coil 3 is energized in the forward direction and the second coil 4 is set to a non-energized state. In a seventh energized state, the first coil 3 is energized in the forward direction and the second coil 4 is energized in the reverse direction. In an eighth energized state, the first coil 3 is set to the non-energized state and the second coil 4 is energized in the reverse direction. Thus, the energized state may also be switched to the fifth energized state, the sixth energized state, the seventh energized state, and the eighth energized state in that order. Accordingly, the magnet 8 is rotated to a position corresponding to the energizing phase.

Next, the positional relationship between the magnet 8, the first outer magnetic-pole portion 1*a*, and the second outer magnetic-pole portion 1*b* will be described below.

When the energized state is switched to the first energized state, the second energized state, the third energized state, and the fourth energized state as described above, the poles to which the first outer magnetic-pole portion 1*a* and the second outer magnetic-pole portion 1*b* are excited are switched alternately.

In the state shown in FIG. 4, the first coil 3 is energized in the forward direction to excite the first outer magnetic-pole portion 1*a* to N pole, so that the magnet 8 receives a clockwise rotational force in the figure which tries to align the center of the first outer magnetic-pole portion 1*a* with the center of a polarized portion (S-pole portion) of the magnet 8. In addition, the second coil 4 is energized in the forward direction to excite the second outer magnetic-pole portion 1*b* to N pole, so that the magnet 8 also receives a counterclockwise rotational force in the figure which tries to align the center of the second outer magnetic-pole portion 1*b* with the center of a polarized portion (S-pole portion) of the magnet 8.

When both coils are energized, the rotational forces applied to the magnet 8 balance each other and the magnet 8 does not move. This state is shown in FIG. 4. When the coils receive the same amount of energizing current, the phase difference between the center of the first outer magnetic-pole portion 1*a* and the center of the polarized portion (S-pole portion) of the magnet 8 and the phase difference between the center of the second outer magnetic-pole portion 1*b* and the center of the polarized portion (S-pole portion) of the magnet 8 are both about 15°.

When the state shown in FIG. 4 is changed by switching the energizing direction of the second coil 4, the second outer magnetic-pole portion 1*b* is excited to S pole and the magnet 8 receives a clockwise rotational force in the figure which tries to align the center of the second outer magnetic-pole portion 1*b* with the center of a polarized portion (N-pole portion) of the magnet 8. At this time, since the energizing direction of the first coil 3 is continuously set to the forward direction, the magnet 8 continuously receives the clockwise rotational force which tries to align the center of the first outer magnetic-pole portion 1*a* with the center of the polarized portion (S-pole portion) of the magnet 8. Therefore, the magnet 8 starts to rotate clockwise from the state shown in FIG. 4.

When the magnet 8 is rotated by about 15° from the state shown in FIG. 4, the center of the first outer magnetic-pole portion 1*a* aligns with the center of the polarized portion (S-pole portion) of the magnet 8. At this time, the center of the second outer magnetic-pole portion 1*b* aligns with the boundary between the polarized portions (between the S-pole and N-pole portions) of the magnet 8, and a rotational force that rotates the magnet 8 further clockwise is generated. Then, when the magnet 8 is further rotated by about 15° from that state, that is, when the magnet 8 is rotated by about 30° from the state shown in FIG. 4, the rotational forces applied by the two coils balance each other and the magnet 8 stops moving. This state is shown in FIG. 5.

Then, when the energizing direction of the first coil 3 is switched to the reverse direction from the state shown in FIG. 5, the first outer magnetic-pole portion 1*a* is excited to S pole and the magnet 8 receives a clockwise rotational force in the figure which tries to align the center of the first outer magnetic-pole portion 1*a* with the center of a polarized portion (N-pole portion) of the magnet 8. At this time, since the energizing direction of the second coil 4 is continuously set to the reverse direction, the magnet 8 continuously receives the clockwise rotational force which tries to align the center of the second outer magnetic-pole portion 1*b* with the center of the polarized portion (N-pole portion) of the magnet 8. Therefore, the magnet 8 starts to rotate clockwise from the state shown in FIG. 5.

When the magnet 8 is rotated by about 15° from the state shown in FIG. 5, the center of the second outer magnetic-pole portion 1*b* aligns with the center of the polarized portion (N-pole portion) of the magnet 8. At this time, the center of the first outer magnetic-pole portion 1*a* aligns with the boundary between the polarized portions (between the S-pole and N-pole portions) of the magnet 8, and a rotational force that rotates the magnet 8 further clockwise is generated. Then, when the magnet 8 is further rotated by about 15° from that state, that is, when the magnet 8 is rotated by about 30° from the state shown in FIG. 5, the rotational forces applied by the two coils balance each other and the magnet 8 stops moving. This state is shown in FIG. 6.

Then, when the energizing direction of the second coil 4 is switched to the forward direction from the state shown in FIG. 6, the second outer magnetic-pole portion 1*b* is excited to N pole and the magnet 8 receives a clockwise rotational force in the figure which tries to align the center of the second outer magnetic-pole portion 1*b* with the center of a polarized portion (S-pole portion) of the magnet 8. At this time, since the energizing direction of the first coil 3 is continuously set to the reverse direction, the magnet 8 continuously receives the clockwise rotational force which tries to align the center of the first outer magnetic-pole portion 1*a* with the center of the polarized portion (N-pole portion) of the magnet 8. Therefore, the magnet 8 starts to rotate clockwise from the state shown in FIG. 6.

When the magnet 8 is rotated by about 15° from the state shown in FIG. 6, the center of the first outer magnetic-pole portion 1*a* aligns with the center of the polarized portion (N-pole portion) of the magnet 8. At this time, the center of the second outer magnetic-pole portion 1*b* aligns with the boundary between the polarized portions (between the S-pole and N-pole portions) of the magnet 8, and a rotational force that rotates the magnet 8 further clockwise is generated. Then, when the magnet 8 is further rotated by about 15° from that state, that is, when the magnet 8 is rotated by about 300 from the state shown in FIG. 6, the rotational forces applied by the two coils balance each other and the magnet 8 stops moving. This state is shown in FIG. 7.

Next, a connection between the stepping motor included in the driving apparatus according to the present embodiment and a barrel will be described below with reference to FIGS. 8 and 9.

Figure 8:
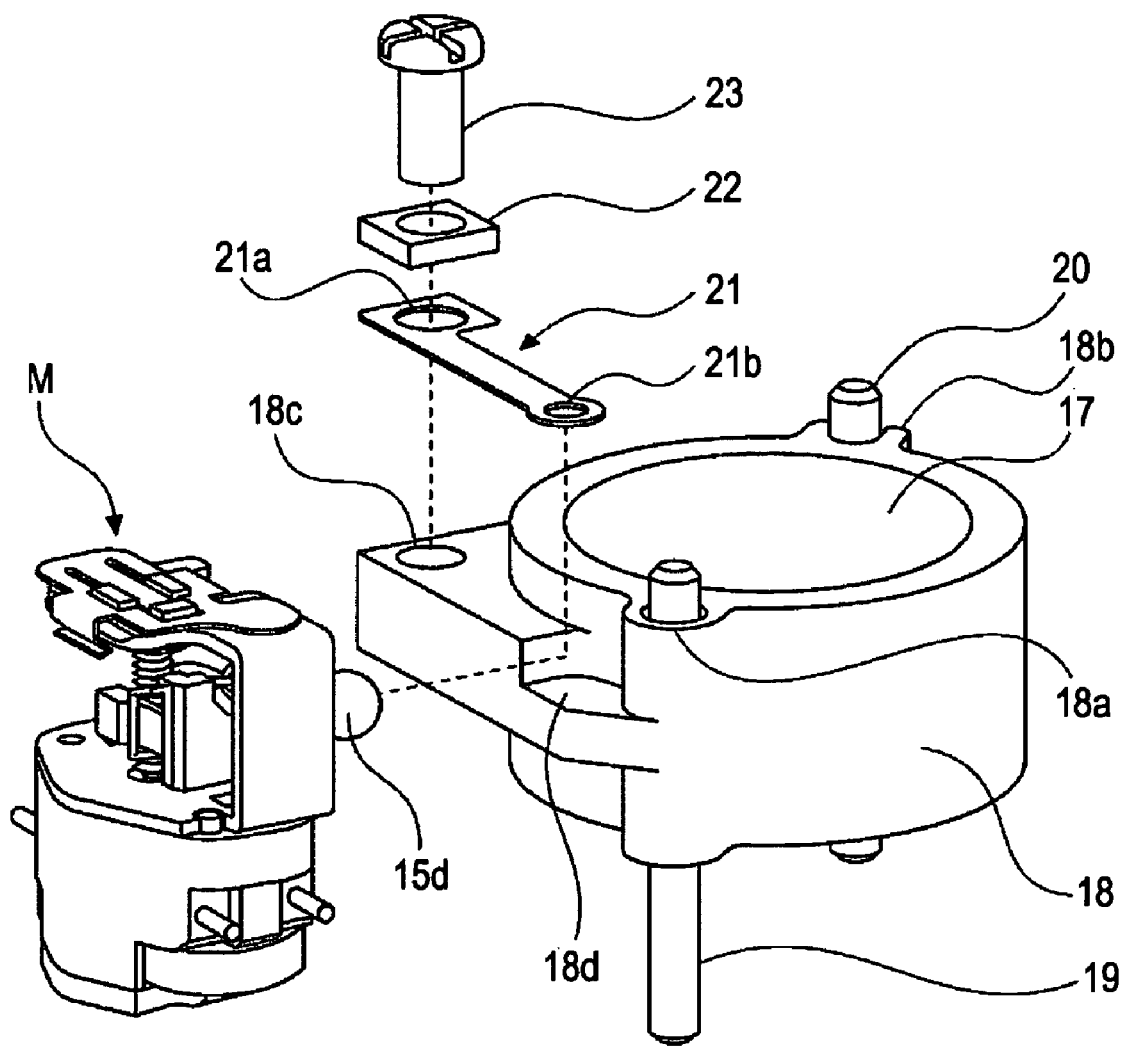
FIG. 8 is an exploded perspective view illustrating the driving apparatus according an embodiment of the present invention.
Figure 9:
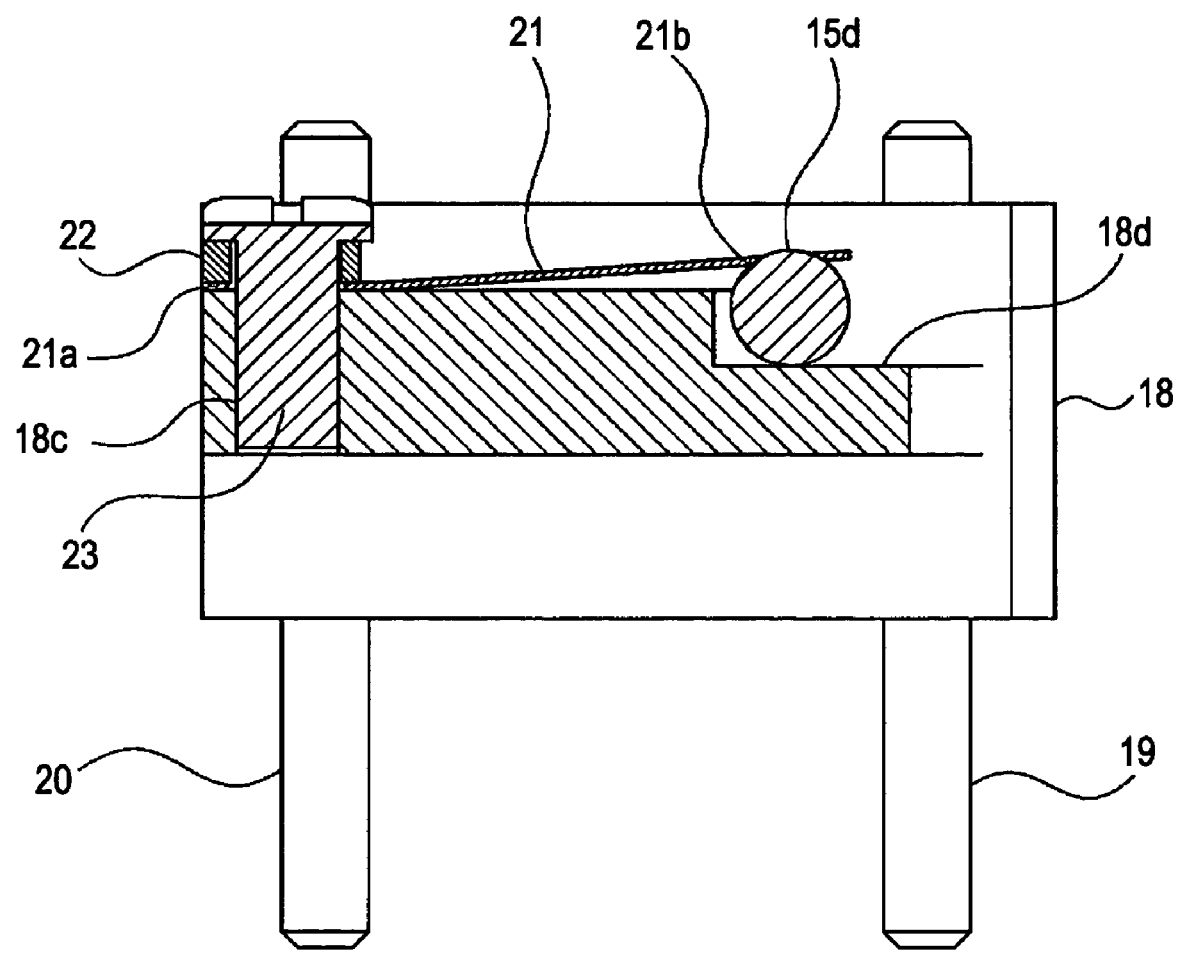
FIG. 9 is a longitudinal sectional view illustrating a connecting unit that connects the stepping motor included in the driving apparatus shown in FIG. 8 to a barrel.
Figure 10:
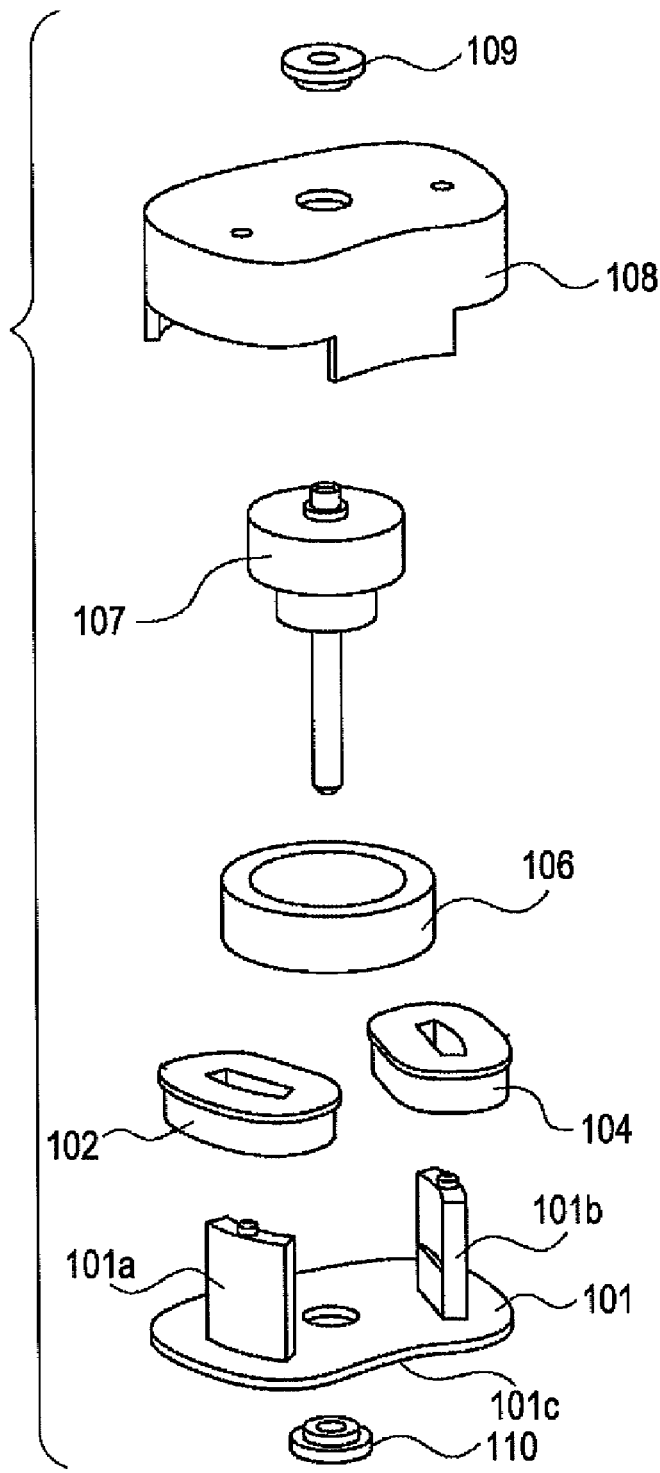
FIG. 10 is an exploded perspective view illustrating a stepping motor according to a first conventional prior art example.
Figure 11:
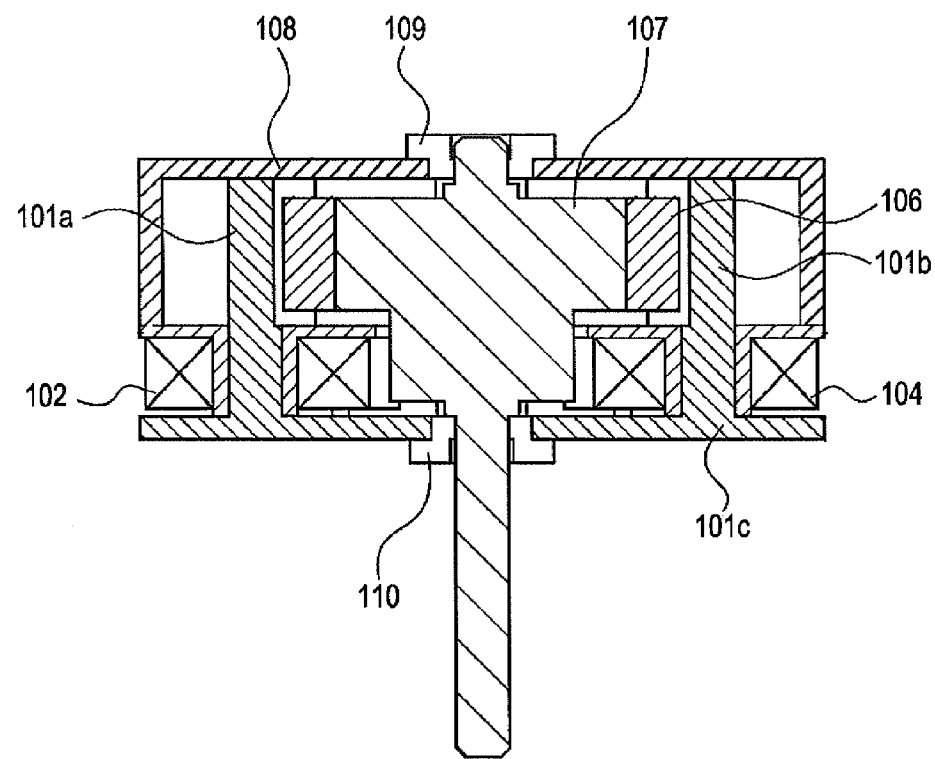
FIG. 11 is a longitudinal sectional view illustrating the stepping motor shown in FIG. 10.

FIG. 8 is an exploded perspective view illustrating the driving apparatus according to the present embodiment and FIG. 9 is a longitudinal sectional view illustrating a connecting unit that connects the stepping motor included in the driving apparatus shown in FIG. 8 and the barrel to each other.

In FIG. 8, the stepping motor included in the driving apparatus according to the present embodiment is denoted by M.

A barrel 18 has a cylindrical shape and a lens 17 is disposed in the barrel 18. The barrel 18 has a shaft hole 18*a*, a projection 18*b*, a spring attachment portion 18*c*, and a rack contact portion 18*d*.

A barrel-retaining bar 19 is inserted through the shaft hole 18a formed in the barrel 18 and retains the barrel 18 such that the barrel 18 can move in a direction of an optical axis of the lens 17.

A barrel-restraining bar 20 is fitted to the projection 18b on the barrel 18 and restrains the barrel 18 from rotating around the barrel-retaining bar 19.

Accordingly, the barrel 18 is retained by the barrel-retaining bar 19 and the barrel-restraining bar 20 such that the barrel 18 can move in the direction of the optical axis.

A connecting spring 21 is a leaf spring that has two holes 21a and 21b.

The connecting spring 21 is fixed to the spring attachment portion 18c of the barrel 18 with a screw 23 and a spring-pressing member 22.

The output member 15d of the rack 15 included in the stepping motor M has a spherical shaped portion at an end thereof. When the connecting spring 21 is fixed to the spring attachment portion 18c of the barrel 18, the connecting spring 21 is positioned such that the hole 21b formed therein comes into contact with the spherical portion of the output member 15d. The connecting spring 21 urges the output member 15d of the rack 15 against the rack contact portion 18c of the barrel 18 with a force larger than the weight of the barrel 18 to which the lens 17 is fixed. Therefore, when the rack 15 moves linearly in the direction of optical axis, the barrel 18 to which the lens 17 is fixed follows the rack 15 without delay and moves linearly in the direction of the optical axis.

The diameter of the hole 21a formed in the connecting spring 21 is larger than the outer diameter of the screw 23, and therefore the position at which the connecting spring 21 is attached to the barrel 18 can be slightly adjusted. When the relative position between the stepping motor M and the barrel 18 includes error in a direction perpendicular to the driving direction (direction of the optical axis), the position at which the connecting spring 21 is attached to the barrel 18 is adjusted such that the entire circumference of the hole 21b comes into contact with the spherical portion of the output member 15d. Accordingly, the barrel 18 and the rack 15 are prevented from receiving a twisting force that function as a drive load.

In addition, the hole 21b formed in the connecting spring 21 has a circular shape, and this hole 21b comes into contact with the spherical portion of the output member 15d. Accordingly, the rack 15 can be urged against the barrel 18 by the connecting spring 21 without backlash and the connecting spring 21 can be easily positioned. It is not necessary that the hole 21b extend through the connecting spring 21 as long as the hole 21b has a circular shape, and the hole 21b may also be formed as a recess. Since the above-described connection structure is used, even if, for example, there is a large fitting backlash between the rack 15 and the rack-retaining bar 14, the backlash can be absorbed and the barrel 18 can be stably driven in the direction of the optical axis with high accuracy. Therefore, the fitting length of the rack 15 and the rack-retaining bar 14 can be reduced and the barrel 18 can be stably driven in the direction of the optical axis with high accuracy even when the dimension of the stepping motor M is reduced in the axial direction.

When the connecting spring 21 is attached to the barrel 18, the connecting spring 21 can be attached from the direction of the optical axis, similar to the process of attaching the barrel 18 to the barrel-retaining bar 19. Accordingly, assembly is facilitated. The connecting spring 21 can be attached such that the output member 15d is placed between the connecting spring 21 and the barrel 18 after the stepping motor M is attached to the barrel 18 from the direction of the optical axis. Alternatively, the stepping motor M can be attached from a direction perpendicular to the optical axis (from the side of the connecting spring 21) such that the output member 15d is placed between the connecting spring 21 and the rack contact portion 18d of the barrel 18 after the connecting spring 21 is attached to the barrel 18. Thus, there is a high degree of freedom in the assembly process.

In addition, since the connecting spring 21 has a simple plate shape with holes formed therein, the cost is low.

As described above, according to the present embodiment, the stepping motor M included in the driving apparatus is structured such that the magnet 8 is fixed to the outer periphery of the rotor (the lead screw shaft 10 and the core 9) arranged between the first outer magnetic-pole portion 1a and the second outer magnetic-pole portion 1b of the stator 1. Therefore, the magnet 8 has high mechanical strength. In addition, the rotor also serves as the inner magnetic-pole portions and it is not necessary to provide gaps between the magnet 8 and the inner magnetic-pole portions. As a result, the magnetic resistance can be reduced and the output of the stepping motor M can be improved.

The stepping motor M is structured such that the outer diameter thereof is determined only from the diameter of the magnet 8 and the thickness of the cover portion 5c of the bobbin 5. In addition, the first outer magnetic-pole portion 1a and the second outer magnetic-pole portion 1b of the stator 1 are formed in a comb-tooth shape so as to extend in the axial direction of the stepping motor M, and the first coil 3 and the second coil 4 are arranged on substantially the same plane. Accordingly, the outer diameter of the stepping motor M and the dimension thereof in the axial direction can be reduced. Thus, the overall size of the stepping motor M can be reduced.

In addition, since the angle member 11 that retains the lead screw shaft 10 covers an end face of the magnet 8, it is not necessary to use an additional top plate. In addition, compared to the structure in which an angle member is additionally attached to the stepping motor, the dimension of the stepping motor M in the axial direction thereof can be reduced. Accordingly, the size and cost of the stepping motor M can be reduced.

In addition, since the lead screw shaft 10 is retained by the stator 1 and the angle member 11 fixed to the stator 1, the shift in coaxiality of the two retaining members can be reduced. Accordingly, the gaps between the outer peripheral surface of the magnet and the inner peripheral surfaces of the first and second outer magnetic-pole portions can be made uniform and the stability of rotation of the stepping motor M can be increased.

In addition, the lead screw shaft 10 is a rotating shaft of the stepping motor M. Therefore, unlike the structure in which, for example, a lead screw shaft is provided separately from a rotating shaft, it is not necessary to connect the lead screw shaft to a rotating shaft. Accordingly, the center displacement that occurs when the lead screw shaft and the rotating shaft are bonded together can be avoided. Thus, the stability of rotation of the stepping motor M can be increased and the cost can be considerably reduced.

In addition, the stepping motor M includes the rack 15 and the rack-retaining bar 14, so that the rotation of the magnet 8 can be converted into the movement of the rack 15 in the axial direction when it is output via the lead screw shaft 10. Therefore, step control of a linear movement of, for example, a lens can be performed by the stepping motor M without using an additional mechanism, such as a speed reducer.

In addition, according to the present embodiment, the position at which the connecting spring 21 is attached to the barrel 18 can be slightly adjusted. Even when the relative position between the stepping motor M and the barrel 18 includes error in a direction perpendicular to the driving direction (direction of the optical axis), the barrel 18 and the rack 15 can be prevented from receiving a twisting force by adjusting the position at which the connecting spring 21 is attached.

In addition, the hole 21*a* formed in the connecting spring 21 has a circular shape, and this hole 21*a* comes into contact with the spherical portion of the output member 15*d*. Accordingly, backlash can be absorbed and the rack 15 can be urged against the barrel 18 by the connecting spring 21 without backlash. In addition, the connecting spring 21 can be easily positioned and the barrel 18 can be stably driven in the direction of the optical axis with high accuracy.

The stepping motor M can be attached to the barrel 18 either from the direction of the optical axis or from a direction perpendicular to the optical axis. Accordingly, there is a high degree of freedom in the assembly process.

The above-described effects are obtained by the structure of the present embodiment, providing a driving apparatus that smoothly drives an optical component with high accuracy using a small, low-cost, high-power stepping motor having a small dimension in an axial direction.

Other Embodiments

Although the driving apparatus for the optical component includes the stepping motor having a lead screw according to the above-described first embodiment, the present invention is not limited to this.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-180544 filed Jun. 21, 2005, which is hereby incorporated by reference herein in its entirety.

What is claimed is:

1. A driving apparatus comprising:
   a stepping motor including a rotor that is capable of rotating about a rotational axis, a lead screw that rotates together with the rotor, and a rack that meshes with the lead screw and includes an output member having an end portion that is convex or at least partially spherical and is positioned at the outer most distal end of the output member;
   a guide member provided parallel to the lead screw;
   a driven member that is retained by the guide member and capable of moving linearly; and
   a spring member attached to the driven member and connecting the rack to the driven member,
   wherein the spring member includes an engaging portion, being formed with a circular hole, provided so that the end portion of the output member is held between the engaging portion and the driven member.

2. The driving apparatus according to claim 1, wherein a direction in which the spring member urges the end portion of the output member is substantially the same as a direction in which the driven member is driven.

3. The driving apparatus according to claim 1, wherein the engaging portion of the spring member includes a circular hole or recess.

4. The driving apparatus according to claim 2, wherein the spring member is attached to the driven member such that a position at which the spring member is attached is adjustable in a direction perpendicular to the direction in which the driven member is driven.

5. The driving apparatus according to claim 1, wherein the stepping motor includes:
   a stator having a first outer magnetic-pole portion and a second outer magnetic-pole portion that extend along the rotational axis and that are integrated with the stator at both ends of the stator;
   the rotor being made of soft magnetic material, that is disposed between the first outer magnetic-pole portion and the second outer magnetic-pole portion, and being rotatably retained by the stator at an end of the rotor with the lead screw interposed between the rotor and the stator, and having a magnet attached to the outer periphery of the rotor; and
   a first coil and a second coil wound around the first outer magnetic-pole portion and the second outer magnetic-pole portion, respectively, in a region between the magnet and the stator along the rotational axis of the rotor.

6. The driving apparatus according to claim 5, further comprising:
   a retaining member fixed to the stator so as to cover an end portion of the magnet and retaining an end portion of the lead screw such that the lead screw can rotate; and
   a rack-retaining bar that is attached to the retaining member and that supports the rack such that the rack is moveable in a direction parallel to an axis of the lead screw.

7. The driving apparatus according to claim 1, wherein the outermost distal end portion of the output member is configured such that it is not in contact with the guide member.

8. The driving apparatus according to claim 1, wherein the spring member does not touch or engage the lead screw.

9. A driving apparatus comprising:
   a stepping motor including a rotor that is capable of rotating about a rotational axis, a lead screw that rotates together with the rotor, and a rack that meshes with the lead screw and includes an output member having a spherical shaped distal end portion that is convex or at least partially spherical;
   a guide member provided parallel to the lead screw;
   a driven member that is retained by the guide member and capable of moving linearly; and
   a flat spring member having one end attached to the driven member and another engaging end portion configured to be biased against the spherical shaped distal end portion,
   wherein the engaging portion is biased against the spherical shaped distal end portion such that the output member is forced against the driven member,
   wherein the distal end portion of the output member is configured such that it is not in contact with the guide member, and
   wherein the spring member does not touch or engage the lead screw.

10. The driving apparatus according to claim 9, wherein the spring member includes an engaging portion, being formed with a circular hole, provided so that the end portion of the output member is held between the engaging portion and the driven member.

* * * * *